A. R. STEVENS.
FRUIT WASHING MACHINE.
APPLICATION FILED AUG. 19, 1913.

1,095,942.

Patented May 5, 1914.
3 SHEETS—SHEET 1.

WITNESSES

INVENTOR
Augustus R. Stevens
BY
ATTORNEYS

A. R. STEVENS.
FRUIT WASHING MACHINE.
APPLICATION FILED AUG. 19, 1913.

1,095,942.

Patented May 5, 1914.
3 SHEETS—SHEET 3.

WITNESSES
J. W. Wells
L. A. Stanley

INVENTOR
Augustus R. Stevens
BY Munn & Co.
ATTORNEYS

UNITED STATES PATENT OFFICE.

AUGUSTUS RENTZ STEVENS, OF TAMPA, FLORIDA, ASSIGNOR OF ONE-HALF TO J. S. LONG.

FRUIT-WASHING MACHINE.

1,095,942.  Specification of Letters Patent.  Patented May 5, 1914.

Application filed August 19, 1913. Serial No. 785,548.

*To all whom it may concern:*

Be it known that I, AUGUSTUS R. STEVENS, a citizen of the United States, and a resident of Tampa, in the county of Hillsboro and State of Florida, have made certain new and useful Improvements in Fruit-Washing Machines, of which the following is a specification.

My invention relates to improvements in fruit washing machines, and it consists in the constructions, combinations, and arrangements herein described and claimed.

An object of my invention is to provide a device which will thoroughly wash fruit such as oranges or lemons, and which will deliver the same in a clean condition.

A further object of my invention is to provide a device of the type described in which the fruit in passing through the machine is rotated so as to expose the parts of the fruit to the cleansing action.

A further object of my invention is to provide a fruit washer which has comparatively few moving parts, and which is therefore not liable to easily get out of order.

Other objects and advantages will appear in the following specification and the novel features of the device will be particularly pointed out in the appended claims.

My invention is illustrated in the accompanying drawings forming part of this application in which—

Figure 1:
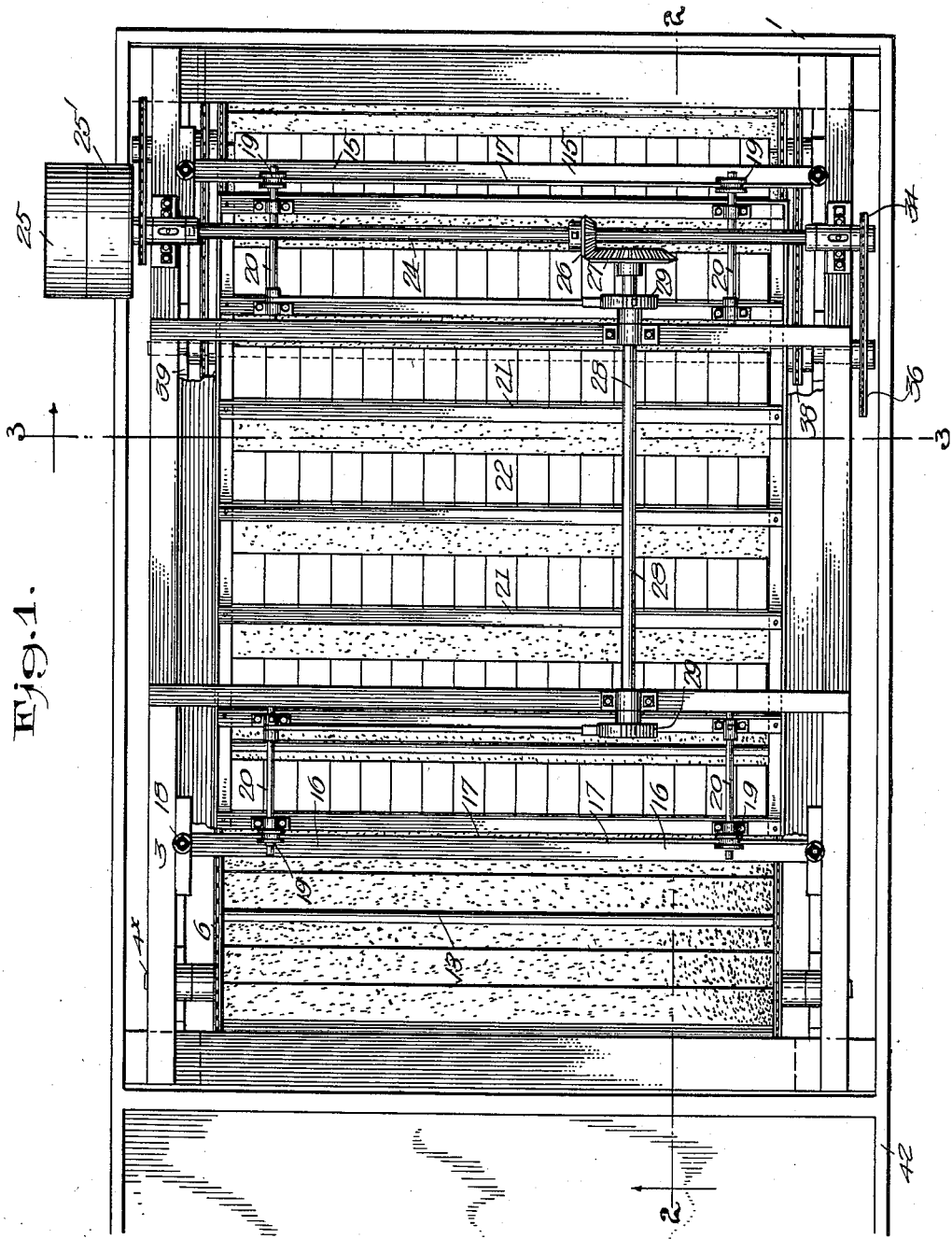
Figure 2:
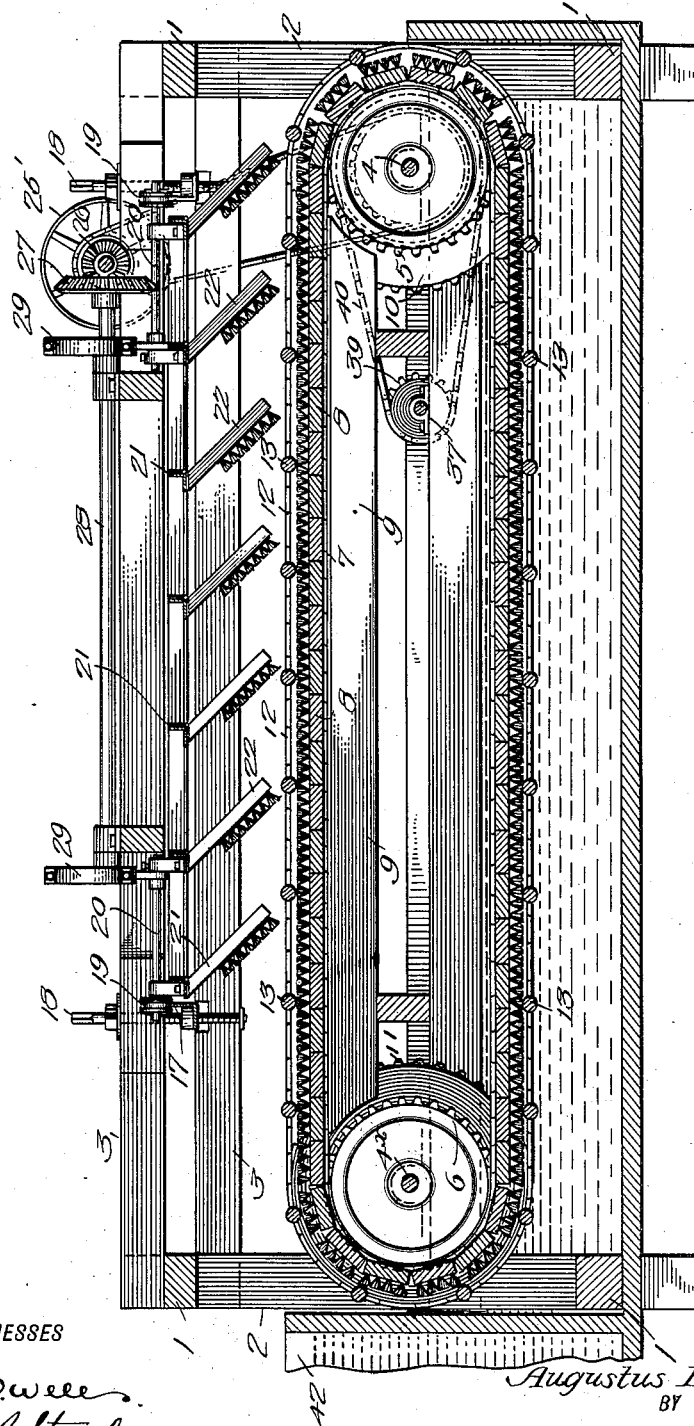
Figure 3:
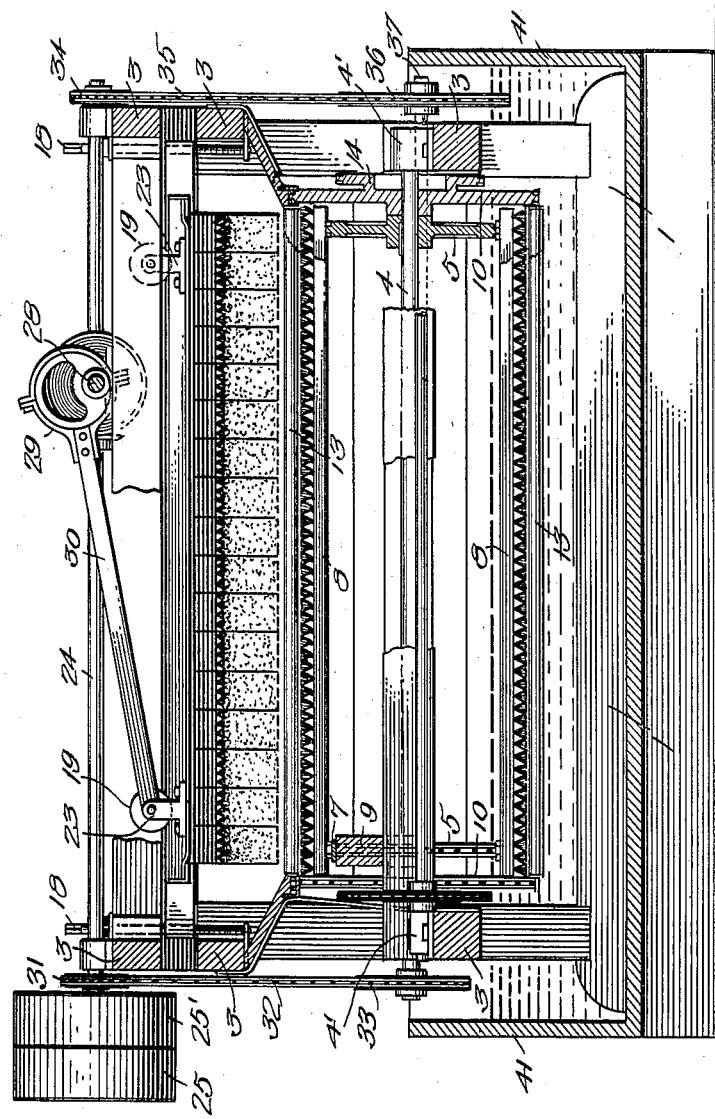
Figure 4:
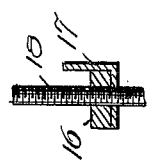

Figure 1 is a plan view of the device, Fig. 2 is a section along the line 2—2 of Fig. 1, Fig. 3 is a section along the line 3—3 of Fig. 1, and Fig. 4 is a detail section through a portion of the device.

In carrying out my invention I provide a frame consisting of the end members 1, the uprights 2, and the side members 3. Disposed at each end of the device is a shaft like those shown at 4 and 4ˣ in Fig. 2. These shafts run transversely of the machine and are supported in bearings 4' (see Fig. 3) carried on the lower side members 3. On the shaft 4 is a pair of sprocket wheels 5 while upon the shaft 4ˣ is mounted a pair of sprockets 6, these sprocket wheels being on the inside of the frame, as shown in Fig. 3. The front and rear sprocket wheels are alined, that is to say, a sprocket wheel 5 on one side is in alinement with a sprocket wheel 6 on the shaft 4ˣ. Endless sprocket chains 7 pass around alined sprocket wheels 5 and 6 on either side of the machine. These chains have fastened to them endless brushes 8 which extend transversely of the machine. Between the front sprocket wheels 5 and the rear sprocket wheels 6 are disposed guide members 9 (see Fig. 2) which support the sprocket chains which bear the brushes, thereby preventing the sagging of the latter and also preventing the chains from jumping off from the sprockets.

On the shaft 4 between each of the sprockets 5 and the bearings on the shaft is a larger sprocket 10. Similar sprockets 11 are carried by the shaft 4ˣ. Sprocket chains 12 connect the registering sprockets 10 and 11 on the two shafts and between the chains on opposite sides of the machine are disposed rods or bars 13 which may be either made of wood or may be gas pipe covered with rubber or canvas. These cross bars 13 are designed to just clear the brushes. The latter, as will be seen from Fig. 2, except at the points where they pass around their sprocket chains, form practically one continuous flat brush. The sprocket wheels 10 and 11 are loose on their respective shafts 4 and 4ˣ, but these sprocket wheels have each secured to them an auxiliary sprocket wheel, such as those shown at 14 in Fig. 3. These latter sprockets 14 are in fact merely rims which are bolted to the sprocket wheels that bear the chains which support the rods.

Referring now to Fig. 1 it will be seen that a pair of cross strips 15 and 16 are provided which extend transversely of the machine. These members, as will be seen from Fig. 4, have L-shaped angle irons 17 secured to them, the upper edges of the angle irons serving as track rails. The strips 16 are suspended by means of bolts 18 from the side members. Mounted upon the rails 17 are the rollers or wheels 19 which are secured on axles 20 carried by a frame or carriage. The latter is provided with a series of cross bars 21 to which are hinged brushes 22. As will be seen from Fig. 2 these brushes are inclined from the horizontal, but are arranged to swing upwardly toward the horizontal. They cannot swing any farther downwardly because the back of the brush is prolonged to engage the under sides of the supports 21. The carriage is suspended from the axles 20 by means of brackets 23 (see Fig. 3).

Extending transversely of the machine is the main drive shaft 24 which is provided with driving pulleys 25 and 25' at one end. The shaft 24 bears a beveled gear 26 which is arranged to engage the beveled gear 27 on a shaft 28. The shaft 28 bears a pair of eccentrics 29 to which are secured arms 30, the latter being pivotally secured to the carriage so as to cause the reciprocation of the carriage in a direction transverse to the movement of the endless chains which bear the brushes.

On the shaft 28 between the pulley 25' and the bearing 3 is a sprocket wheel 31 over which a sprocket 32 runs. The latter engages a sprocket wheel 33 on the shaft 4. At the opposite end of the shaft 28 is a sprocket 34 bearing a sprocket chain 35 which drives a sprocket wheel 36 on a shaft 37. The shaft 37 bears a pair of sprocket wheels 38 and 39, the former being in alinement with one of the sprocket rims 14, and the other being in alinement with the other sprocket rim 14. Sprocket chains 40 run over these sprocket rims and over the respective sprocket chains 38 and 39.

From the foregoing description of the various parts of the device the operation thereof may be readily understood.

The frame may be placed in a tank 41 if the device is to be used in washing fruit and water is placed in the tank so as to cover the lower part of the endless chains bearing the brushes and bars as will be seen from Fig. 2. Outside of the tank 41 and contiguous to one end of the machine is a tank 42, a portion of which is shown in Figs. 1 and 2. Power is applied to the pulley 25' which, through the medium of the shaft 24, and beveled gears 26 and 27, drives the shaft 28, and thus reciprocates the frame which bears the inclined brushes. The same shaft 28, through the medium of the sprocket 34, chain 35, sprocket 36, shaft 37, sprockets 38 and 39, sprocket chains 40 and sprockets 14, drives the sprockets 10 and 11, thus driving the sprocket chains 12 which bear the rods 13. It will be observed that owing to the fact that the sprockets 34, 38 and 39 are small whereas the sprockets 36 and 14 are large, the speed of the chains 12 is much less than that of the chains 7. Therefore the brushes 8 will travel considerably faster than the rods 13, although both are traveling in the same direction. The fruit is conveyed from the tank 42 and deposited upon the traveling brushes 8 by any suitable conveyer (not shown). Here they are carried upward until they reach one of the bars 13 where the fruit is retarded and is reached by the rapid passage of the brushes upon which it is carried. In passing along the fruit engages the inclined brushes 22 which, as explained, are reciprocating transversely to the direction of motion. While these bear but lightly on the fruit they tend to turn the latter so that all sides of the fruit are thoroughly brushed. The fruit which is deposited upon the brushes is thoroughly cleaned out by the passage of the brushes through the water as they are returned to the receiving end.

By means of the bolts 18 the traveling carriage may be raised or lowered so as to accommodate fruits of different sizes. Thus the machine may be made to operate as well on small fruits as on large.

The tank may be dispensed with and the device may be used dry as a brusher or polisher.

I claim:

1. In a fruit washer, a frame, a movable support for the fruit carried by said frame, said support comprising a continuous flat brush, means disposed above said brush for retarding the movement of the fruit, and means for moving said retarding means in the same direction as the movable brush but at a slower speed.

2. In a fruit washer, a frame, a movable support for the fruit carried by said frame, said support comprising a continuous flat brush, means disposed above said brush for retarding the movement of the fruit, said last named means comprising a series of transverse rods disposed immediately above said movable brush, and means for moving said rods in the direction of travel of the moving brush and at a slower speed.

3. In a fruit washer, a frame, a series of brushes disposed transversely of said frame, endless chains for supporting said brushes, the brushes between the ends of the machine at any one time forming substantially one flat brush for supporting the fruit, means for driving said endless chains, means for retarding the fruit carried by the brushes, said last named means comprising a series of transverse bars, endless chains for supporting said transverse bars, and means for driving said endless chains at a slower speed than the chains which support the brushes.

4. In a fruit washer, a frame, a movable support for the fruit carried by said frame, said support comprising a continuous flat brush, means disposed above said brush for retarding the movement of the fruit, a series of hinged brushes extending transversely across the machine, said last named brushes being inclined downwardly and being arranged to swing upwardly by the engagement of the fruit, and means for reciprocating said hinged brushes transversely of the machine.

5. In a fruit washer, a frame, a pair of parallel endless chains carried by said frame, means for moving said endless chains simultaneously, a series of transverse brushes carried by said endless chains, said brushes being contiguous to form a flat brush between the ends of the machine and adapted to support the fruit, a second pair of chains parallel with said first mentioned chains, a series of bars carried by said second set of parallel chains, said bars being arranged to pass above said brushes, means for driving the chains which bear the brushes at one speed, and means for driving the chains which bear the bars at a slower speed.

6. In a fruit washer, a frame, a pair of parallel endless chains carried by said frame, means for moving said endless chains simultaneously, a series of transverse brushes carried by said endless chains, said brushes being contiguous to form a flat brush between the ends of the machine and adapted to support the fruit, a second pair of chains parallel with said first mentioned chains, a series of bars carried by said second set of parallel chains, said bars being arranged to pass above said brushes, means for driving the chains which bear the brushes at one speed, means for driving the chains which bear the bars at a slower speed, a series of transverse brushes disposed above and inclined toward said first named brushes, said inclined brushes being hinged at their upper ends and adapted to be raised by the engagement of the fruit, and means for reciprocating said inclined brushes transversely of said flat brush.

7. In a fruit washer, a frame, a pair of parallel endless chains carried by said frame, means for moving said endless chains simultaneously, a series of transverse brushes carried by said endless chains, said brushes being contiguous to form a flat brush between the ends of the machine and adapted to support the fruit, a second pair of chains parallel with said first mentioned chains, a series of bars carried by said second set of parallel chains, said bars being arranged to pass above said brushes, means for driving the chains which bear the brushes at one speed, means for driving the chains which bear the bars at a slower speed, a series of transverse brushes disposed above and inclined toward said first named brushes, said inclined brushes being hinged at their upper ends and adapted to be raised by the engagement of the fruit, means for reciprocating the inclined brushes transversely of said continuous flat brush, and means for preventing the contact of the inclined brushes with the first named brushes.

8. In a fruit washer, a frame, a pair of parallel endless chains carried by said frame, means for moving said endless chains simultaneously, a series of transverse brushes carried by said endless chains, said brushes being contiguous to form a flat brush between the ends of the machine and adapted to support the fruit, a second pair of chains parallel with said first mentioned chains, a series of bars carried by said second set of parallel chains, said bars being arranged to pass above said brushes, means for driving the chains which bear the brushes at one speed, means for driving the chains which bear the bars at a slower speed, a series of transverse brushes disposed above and inclined toward said first named brushes, said inclined brushes being hinged at their upper ends and adapted to be raised by the engagement of the fruit, means for reciprocating the inclined brushes transversely of said continuous flat brush, means for preventing the contact of the inclined brushes with the first named brushes, and means for reciprocating the inclined brushes in a direction transverse of the movement of the first named brushes.

AUGUSTUS RENTZ STEVENS.

Witnesses:
R. SMITH,
J. S. LONG.